US005650800A

United States Patent [19]

Benson

[11] Patent Number: 5,650,800

[45] Date of Patent: Jul. 22, 1997

[54] REMOTE SENSOR NETWORK USING DISTRIBUTED INTELLIGENT MODULES WITH INTERACTIVE DISPLAY

[75] Inventor: Andrew Thomas Benson, Seattle, Wash.

[73] Assignee: InElec Corporation, Seattle, Wash.

[21] Appl. No.: 441,287

[22] Filed: May 15, 1995

[51] Int. Cl.[6] .............................. G05B 9/02; G05B 23/02

[52] U.S. Cl. ...................... 345/173; 364/188; 340/825.06

[58] Field of Search .................................... 340/525, 508, 340/825.06, 505, 286.01; 364/188, 146; 345/173

[56] References Cited

U.S. PATENT DOCUMENTS

| | | | |
|---|---|---|---|
| 4,333,090 | 6/1982 | Hirsch | 340/365 |
| 4,459,582 | 7/1984 | Sheahan et al. | 340/508 |
| 4,613,848 | 9/1986 | Watkins | 340/541 |
| 4,962,473 | 10/1990 | Crain | 340/541 |
| 4,992,866 | 2/1991 | Morgan | 340/825.06 |
| 5,274,370 | 12/1993 | Morgan et al. | 340/825.56 |
| 5,297,252 | 3/1994 | Becker | 364/188 |
| 5,416,725 | 5/1995 | Pacheco et al. | 340/825.06 |

OTHER PUBLICATIONS

D&S Technologies product flyer, 1 page.

DSC Security Products brochure for the PC4000 Alarm Control Systems, 2 pages.

Northern Computers, Inc. brochure for PC–PAK Access Control Software System, 2 pages.

Panasonic Broadast & Television Systems Co. brochure for PFW–300, 2 pages.

Magic Link Personal Intelligent Communicator by Sony, 4 pages.

Graphic Link Software brochure by Scientific Approaches, 3 pages.

AMX Axcess Control System brochure by AMX Corporation, 2 pages.

LonWorks Control Networking Overview brochure, and appended Overview brochure, 10 pages.

Tracer Know–how License Policy—T–Buss by Tracer Electronics, Inc., 5 pages.

Hirsch Electronics Corporation product brochure, 2 pages.

Infinity products brochure by Andover Controls, Facility Protection Group, 4 pages.

*Primary Examiner*—Wendy Garber

*Attorney, Agent, or Firm*—Stephen M. Evans

[57] ABSTRACT

A system remote sensor network that uses distributed intelligent modules includes a control panel having at least one intelligent sensor loop for coupling intelligent sensors, i.e., sensors having a unique ID, with the control panel and at least one remote interface module having an interactive display. A graphic representation of the floor plan in vector form is stored in the panel and module memories. In addition, the vector location of each peripheral coupled to the intelligent sensor loops is stored in each module's memory. By storing the floor plan in vector form, both low and high detail display images can be displayed with minimum memory requirement. Upon the issuance of a display command generated either by a user or by the panel, the graphic representation of the floor plan and locations of the sensors is displayed on the remote interface module. If a sensor has been activated when the network is active, the location of the activated sensor can be immediately known by commanding the interface module to display the sensor and related floor plan detail. Utilizing the graphic user interface of the interface module also greatly expands the functionality of the module by permitting a user, from the module, to enter pass codes, monitor the system, or modify the system. Extensive use of icons also decreases language barriers when the system is used by non-English speaking users.

19 Claims, 8 Drawing Sheets

FIG. 1
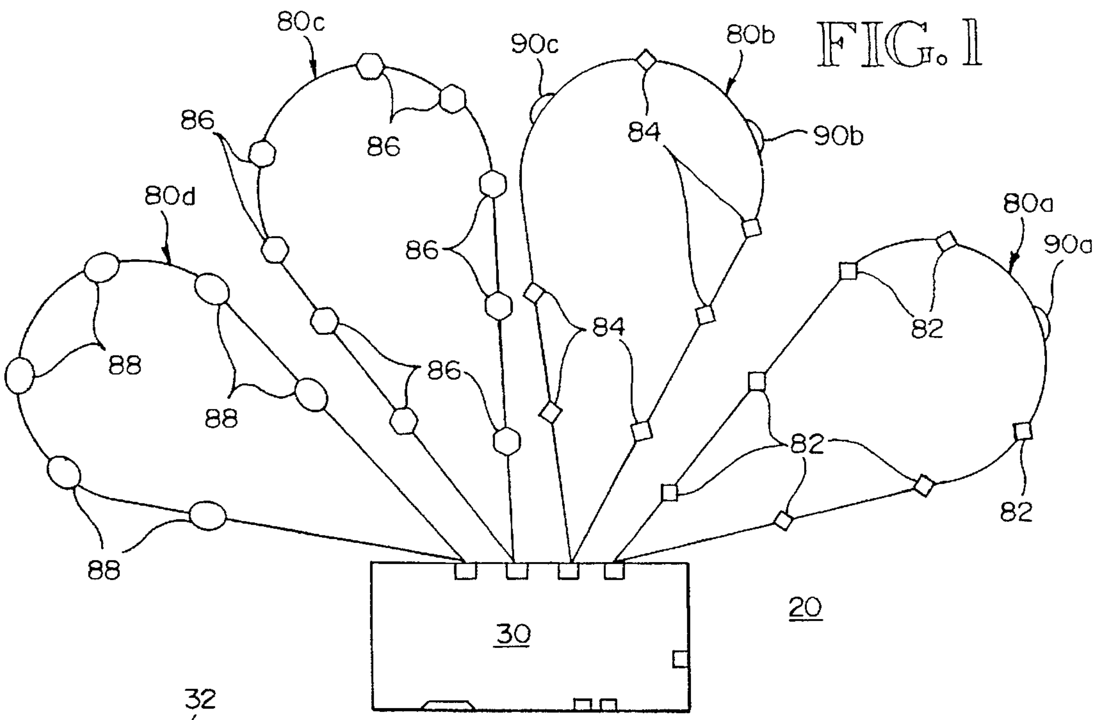
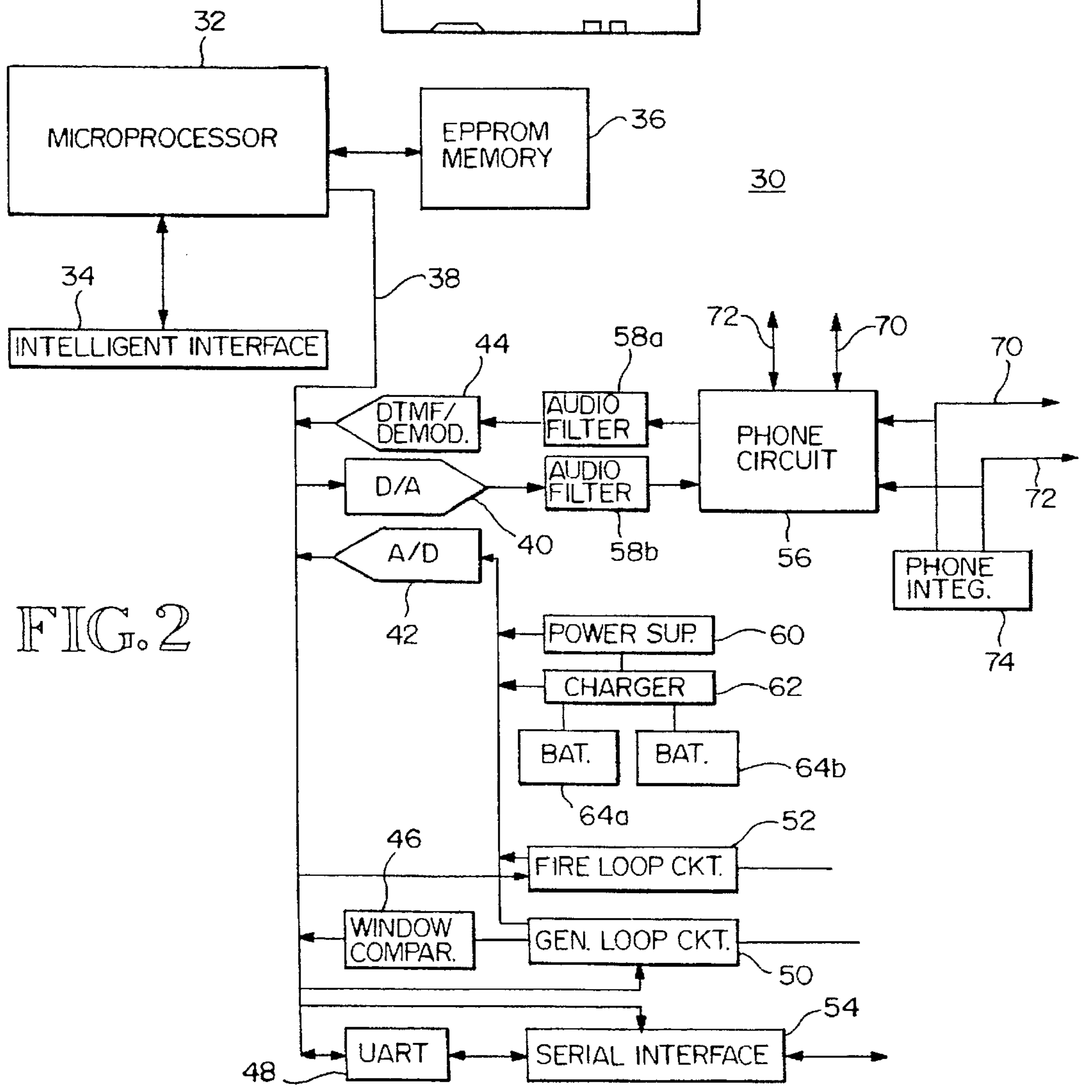
FIG. 2

REMOTE SENSOR NETWORK USING DISTRIBUTED INTELLIGENT MODULES WITH INTERACTIVE DISPLAY

FIELD OF THE INVENTION

The present invention relates in general to input/output modules for use in remote sensor networks and more particularly to graphic user interface modules of the type involving security sensor networks used in access control, perimeter alarm, vault alarm, and fire alarm systems, alone or in combination with each other.

BACKGROUND OF THE INVENTION

In the field of remote sensor networks, common applications include access control, perimeter alarm, vault alarm, and fire alarm systems. In each of these applications, it is necessary to have a central monitoring and relay unit, or control panel, to which was connected one or more dedicated sensors, usually in loop configurations. If any sensor was activated, then the central control panel carried out one or more specified routines such as activating an audible alarm and establishing a communications link with an appropriate central station if the sensor was in a perimeter alarm system. In such applications, it was also desirable to have one or more remote access modules which may permit a user to modify a subroutine. For example, a remote access module usually permitted the central control panel to bypass an alarm sequence subroutine if a certain troublesome sensor has been activated. In such instances, the remote access module may have be located outside a premises having a network of security type sensors. Upon entering an appropriate command, usually via a keypad, the module sent a predetermined signal to the central control panel based upon the command entered. In this manner, portions or the entire system could be enabled, disabled, or the system reset. Other types of access control modules were used to control access to restricted areas and to record the ID of the person entering that area.

For security type applications, remote access modules were usually in the form of numeric keypads. Early models were of a traditional 10 key configuration. A user, knowing a key combination, would enter the combination to activate a predetermined command instruction. Different combinations would permit the user, via the keypad, to execute different command instructions. As concern over the level of security provided by such models increased, more robust versions began to become available. An improvement included variable indica keypads used for access control applications wherein each key did not have a predetermined indica. Thus, an unauthorized observer could watch an authorized user's key stroke pattern, but because the values of the depressed key combinations would change at the next time of attempted access, knowledge of which keys were depressed in a particular order became meaningless without knowledge of what indica each key had at the time of observation. Several United States patents have been granted on such technology, including U.S. Pat. No. 4,333,090 issued to Hirsch and incorporated herein by reference.

In addition to security concerns, it was desirable to provide the user with information as to the status of the sensor network. To this end, several newer keypads provided textual information concerning the status of the system. Thus, a user could determine whether the system was armed, on standby, or had been compromised. Robust versions provided information concerning the status of any activated sensor loop and perhaps the location of any active sensor, but presented such information only by way of code. Because of the limited and cryptic nature of information provided by such units, a shortcoming of this technology has been the need for the user to know what certain displayed codes meant, and how to respond to them. As an illustration of this shortcoming, the following example is provided. In an alarm system having at least one such keypad, the alarm was activated and the user desired to know which area covered by the system has been affected, and also desired to deactivate the same and further, send a notice of false alarm to the public security agency. The user entered his or her access code via the keypad and might be able to observe information concerning the section of the system having the active sensor. This information was usually in the form of a sector location such as C-13. If the user knew the physical location of this sector and determined that it is likely a false alarm, then a deactivation code could be entered, if known and permitted. Furthermore, a cancel signal, which notified all destinations of the nature of the present status, may have be generated by further input. Nevertheless, each command must have been sequentially entered in the order proposed by the module's display.

SUMMARY OF THE INVENTION

The present invention relates to sensor network systems having a main control panel to which is operatively coupled at least one sensor and at least one remote interface module, components thereof, and methods of use concerning the same. An object of the invention is to provide a system wherein network control and query operations are distributed between the main control panel and the at least one remote interface module. By assigning each component type in the system with certain functions, user or network initiated commands, which do not require the immediate resources of the main control panel, are carried out by the at least one remote interface module. The resulting distributed intelligence permits a high level of system flexibility as will be demonstrated below.

The main control panel of the present invention is characterized as a processor, memory, sensor interface having at least one intelligent sensor loop, and at least one data input and output interface adapted to permit communication to and from the panel. Any sensor of the type conventionally used for perimeter or vault alarm systems, any sensor of the type conventionally used for fire alarm systems, or combinations thereof is operatively connected to the sensor interface. In addition to the foregoing, the sensor interface of the present invention provides a means for connecting one or more intelligent sensors as well as one or more interface modules by way of an intelligent sensor loop. Intelligent sensors are considered to be those that are capable of transmitting a signal along one or more data wires when activated and such signal is uniquely identifiable by a receiving device. These sensors may only transmit a signal when activated, may periodically transmit status signals (one form of signal when activated and another form when inactive), and/or may be responsive to a polling signal. By utilizing intelligent sensors, the control panel is provided with information which is unique to each sensor, thereby permitting identification of any sensor in the loop. Consequently, the control panel, via its microprocessor and memory, can not only determine that a sensor has been activated, but also which sensor in the loop has been so activated.

The panel memory has sufficient capacity to store control operation commands, information pertaining to authorized user names and pass codes, as well as system operation schedules. Optionally, the main control panel has in its memory a table or list of sensor IDs, if available, and security or fire telephone numbers if the control panel is also equipped with a telco interface. In addition to the foregoing, it is desirable to provide sufficient memory capacity to log significant activities received by the control panel. For example, a log of events after activation of a sensor can be recorded. In this manner, each tripped or violated sensor will have a time code associated with it, the combined information being transmittable to at any remote interface module to present a history of all activities after the first sensor is tripped, e.g., subsequent sensor activations to identify the progression of events. This would be especially useful in crime reconstruction and/or arson investigation procedures.

The main control panel preferably has non-intelligent sensor loops that enable it to power and monitor the status of heterogeneous sensor types, i.e. 12 VDC and 24 VDC sensors. In this manner, both perimeter alarm sensors and fire alarm sensors can be integrated into one operating system which permits the main control unit to be used with existing sensor networks. The main control panel also has the ability to selectively power down each loop circuit. For example, current Underwriter Laboratory requirements dictate that commercial perimeter alarms be active for at least 4 hours after a main power failure; fire alarms be active for at least 24 hours; and vault alarms for at least 72 hours. Using the described loop circuitry, a single uninterruptible power supply can be utilized for all circuits, thereby reducing consumer costs. However, because the battery supply voltage is finite, control logic in the main control panel will selectively disable each loop after a predetermined time, thus conserving battery power for critical loops. In a preferred embodiment, a telco interface is provided to communicate both the power loss and subsequent power-downs to the central station for appropriate actions.

Many of the invention's features are carried out by the remote interface module. The remote interface module is characterized as a housing and exposed visual display adapted to display at least one graphic representation of user identifiable indica corresponding to physical plan of the monitored area in conjunction with a displayed portion of the sensor network. To permit display of this information, internal to the housing is a processor, memory, and video display controller, the elements not being necessarily discrete. The memory is of sufficient size to store at least one graphic representation of the physical area wherein the at least one sensor is located. Preferably, an icon representing the at least one sensor is presentable on the graphic representation display in a position which corresponds with its actual position. In this manner, a user may be presented with a graphic "blue print" of the monitored area with the position and status of the at least one sensor indicated thereon.

To permit manipulation of the graphic representation display as well as to perform selective network system functions, an input means is provided. The input means may be separate and manually responsive to a user, integral with the display such as by use of a touch screen overlay, or may be responsive to voice, image, or magnetic code. In a preferred embodiment, a Liquid Crystal Display (LCD) is used as the visual display and a touch sensitive matrix is overlayed thereon. The display/matrix combination provides both the output and input means, which are variable and depend upon the type and location of displayed indicia. As a consequence of this combination, a user may activate the interface module, enter an appropriate code after the display has presented an entry code matrix (such as randomly generated keypad indicia), and query or control the system by touching appropriate icon indicia which are presented in response to user input.

Also in a preferred embodiment, a floor plan of the monitored area is stored in the module's memory and can be displayed upon demand by a user having an appropriate access level or upon activation of a sensor as determined by the main control panel. Moreover, the location of each sensor having an ID can be indicated or overlayed thereon as previously described.

In preferred form, the floor plan of the area covered by the sensor network is stored in the module's memory in vector format which beneficially maximizes memory utilization and permits nearly unlimited scaling possibilities. Thus, by touching the matrix in an area of the floor plan, a greater scale can be obtained. Additionally, by keeping the floor plan "local", data transmission volume between the main control panel and each module is significantly reduced. Also in this embodiment, a user can selectively enable or disable one or more sensors, or perform diagnostics thereon. New intelligent sensors can be added to any intelligent sensor loop by simply tapping there into, and locating the new sensor on the appropriate floor plan via a sensor location routine present at the remote interface module. Similarly the location of existing intelligent sensors can be changed and/or removed from the interface module's memory.

The distributed intelligence of the present invention also permits extension of new sensor networks from any remote interface module, thus avoiding the requirement of wiring such a new network back to the control panel. Each module has a loop pass-through provision to enable the addition of intelligent components, e.g., audible warning bells, sensors, or interface modules.

These and other features of the invention will become apparent upon inspection of the several drawings and review of the related disclosure.

BRIEF DESCRIPTION OF THE DRAWINGS

FIG. 1 is a schematic of a system embodiment of the invention showing a central control panel, and sensor loops with sensors and remote interface modules;

FIG. 2 is a block diagram of the control panel showing the various discrete components associated therewith;

DETAILED DESCRIPTION OF THE INVENTION

Figure 3:
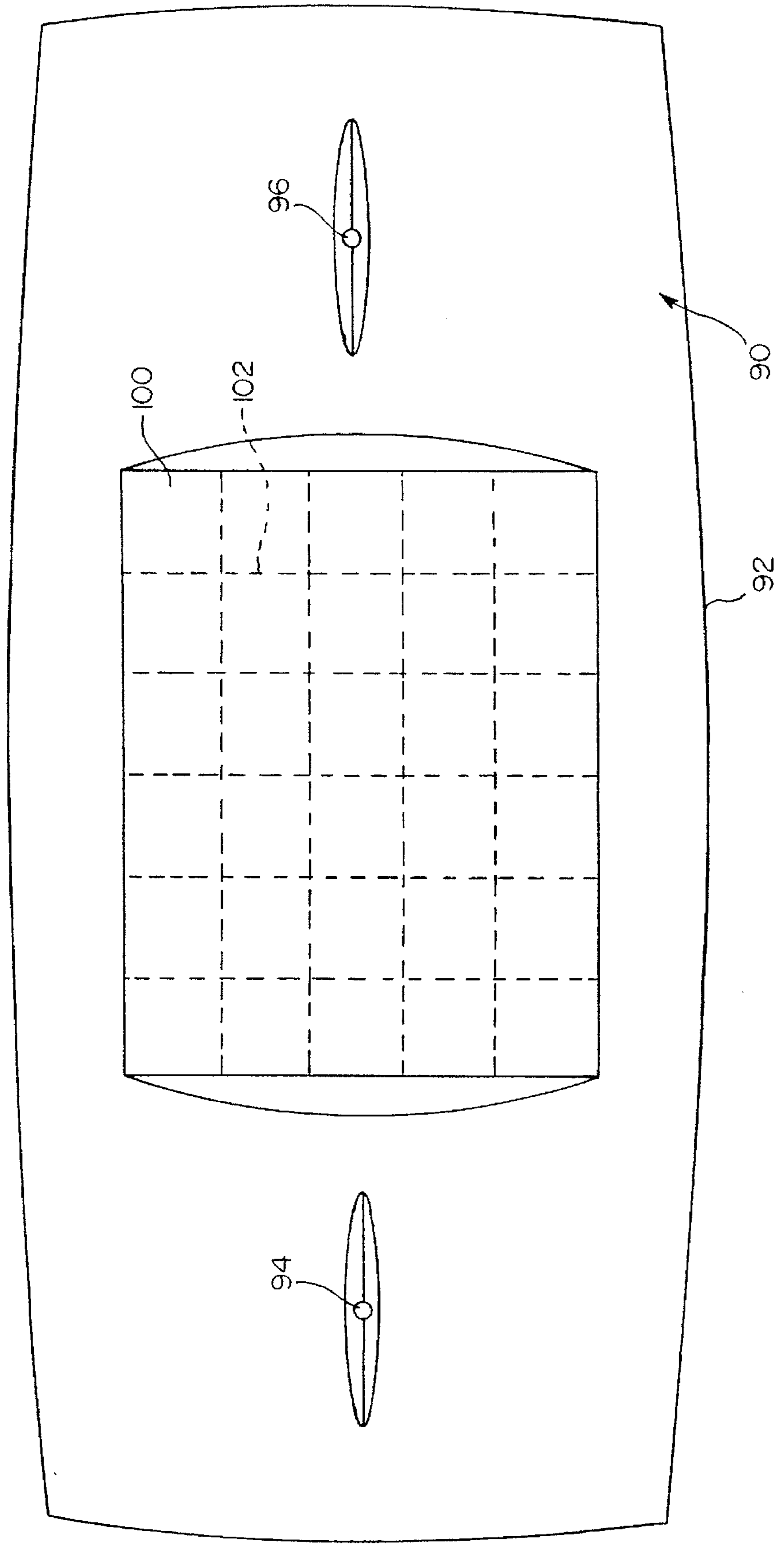
FIG. 3 is an elevation view of an interface module shorting the display screen with interface matrix shown in phantom.

Referring then to the several figures wherein like numerals indicate like parts and more particularly to FIG. 1, a schematic representation of the present system embodiment of the invention is shown. System 20 comprises three main component types, namely control panel 30, intelligent sensors 82, intelligent sensors 84, non-intelligent sensors 86, non-intelligent sensors 88, and remote interface modules 90 (which is a generic reference to interface modules 90*a–c*).

To better understand the functionality of control panel 30, inspection should first be made to intelligent sensor loops 80*a* and 80*b*. Intelligent sensor loops 80*a* and 80*b* operatively couple sensors 82 and 84 to control panel 30 and are composed of at least two data wires (a second pair of power wires is preferable and often necessary as those persons skilled in the art will appreciate). Intelligent sensor loops 80*a* and 80*b* are similar to computer network links; each loop permits up to 64 unique primary addresses to be identified and utilized over a single pair of wires. Each sensor 82 or 84 in any intelligent sensor loop is selected to be "intelligent" insofar as they are capable of transmitting a signal along loop 80*a* or 80*b* as the case may be when activated and such signal is uniquely identifiable by panel 30. These sensors may only transmit a signal when activated, may periodically transmit status signals (one form of signal when activated and another form when inactive), and/or may be responsive to a polling signal. In the present form, the intelligent sensors are pollable and provide panel 30 with a unique ID code when prompted by the panel. The importance of this feature will be discussed in more detail below.

To utilize non-intelligent sensors such as sensors 86 shown in FIG. 1, a non-intelligent loop 80*c* is provided as is well known in the industry. Here, sensors 86 are serially connected to loop 80*c* and coupled with panel 30. Variances in voltage potential from normal as detected by window comparator 46 (see FIG. 2) will indicate that any sensor 86 in loop 80*c* has been tripped, however, it will not be known which sensor has been so tripped. A similar configuration exists in respect to non-intelligent sensors 88 and loop 80*d* which are in this case, 24 VDC fire sensors.

In FIG. 2, a schematic block diagram illustrates the basic functional components of panel 30. In relevant part, the componentry of panel 30 includes microprocessor 32 to which is bi-directionally coupled intelligent loop interface 34, EEPROM (Flash) memory 36, and bus 38. Coupled to bus 38 is D/A converter 40, A/D converter 42, DTMF demodulator 44, fire loop circuit 52, non-intelligent loop interface 50, window comparator 46, and UART 48 and further components as shown. Microprocessor 32 carries out routines stored in memory 36 as directed by commands received via intelligent loop interface 34 and system status as provided by bus 38. In addition to storing routines for panel 30, memory 36 maintains the previously described database. The database also correlates the unique identifier or ID for each intelligent sensor, remote interface module, or other device which must be selectively monitored with a short system ID. Consequently, when panel 30 provides information concerning intelligent sensors to each interface module 90, it need only transmit the short system ID as opposed to a longer actual sensor ID, Finally, a table of user access codes and associated security levels are maintained in memory 36 as well as dial-out numbers and associated status signal codes.

Control panel 30 includes telco interface 56 which is coupled with two, separate publicly switched telephone lines. Line 1 (70) is assigned highest priority and is used to communicate critical signals to a central monitoring agency. Line 2 (72) is assigned a lesser priority and is used to communicate general system status to the system manufacturer or the like. Thus, for example, if a sensor is tripped when the system is active, a dialer (not shown) attempts to establish contact with the central monitoring agency via line 1 (70). When a connection is established, a predefined alarm signal is broadcast. As is common in the industry, a confirmation signal is sent to the system which then initiates a second dial-out on line 2 (72). After establishing a connection with the destination device, system status information is transmitted thereto.

Telco interface 56 is intended to provide dedicated "listen in" capability and provide outgoing system diagnostics upon activation of an appropriate alarm routine. For diagnostic purposes, an RF activated relay is optically coupled to microprocessor 32 which causes the initiation of a dial-out on line 2 (72) and transmission of alarm status information. Preferably, the RF activated relay is activated by an RF signal generated from a commercial paging system which emits a coded signal in response to a dialed number. In this manner, only persons knowing the proper paging number and having access to the preprogrammed out-dial number will be able to retrieve the diagnostic systems information.

In addition to the foregoing, control panel 30 has an uninterruptible power supply (UPS) power back-up. In the present embodiment, existing battery back-ups can be re-used because battery charger 62 selectively monitors and maintains dissimilar batteries, e.g., batteries 64*a* and 64*b*, which may be used with dissimilar sensor loops that are coupled to control panel 30. Thus, as is common in the industry, fire sensor loops utilizing 24 VDC and perimeter sensor loops utilizing 12 VDC can be linked into a single control panel. The status of batteries 64*a* and 64*b* are monitored and information concerning their condition is relayed, via A/D converter 42, to microprocessor 32. Consequently, should the condition of a battery decline beyond a minimum threshold, the signal relayed to microprocessor 32 would cause a low battery warning routine to be executed. Similarly, the control logic carried out by microprocessor 32 will control the operation of each circuit when panel 30 is operating under battery power. For example, current Underwriter Laboratory requirements dictate that commercial perimeter alarms be active for at least 4 hours after a main power failure; fire alarms be active for at least 24 hours; and vault alarms for at least 72 hours. Thus, the control logic will selectively disable each loop after a predetermined time, thereby conserving battery power for critical loops.

As will be described below, a means must exist for defining the operations of panel 30. To this end, interface port 54 is provided. Interface port 54 is preferably a RS-232 port that is connected to bus 38 via UART 48 which is in communication with microprocessor 32 as previously described. Interface port 54 enables preloading of information into memory 36 during the installation process as well as coupling of a printer or other peripherals for generating reports at the panel location, or performing other permitted on-site diagnostics.

A primary feature of the invention is that minimal interactiveness is required between any interface module and the control panel. In particular, control panel 30 regularly broadcasts data packets regarding the status of the system to interface modules 90*a–c* via intelligent loops 80*a* and 80*b* whereupon each module receives, verifies, and stores the status information. When requested to display status information, any interface module 90 need only query its own memory to display the status of the system, thus minimizing the bandwidth necessary to transmit data along any intelligent sensor loop 80*a–b*. If an interface module 90 must communicate with panel 30, then a request packet is broadcast through the pertinent intelligent loop and is received by microprocessor 32.

Interface module 90 is better shown in FIG. 3 wherein housing 92 is preferably constructed of a lightweight yet strong material such as an aluminum composite or a reinforced polymer. Module 90 is characterized as having a generally centrally positioned display screen 100 of the liquid crystal display (LCD) type, although other types of displays can be employed such as a CRT. Standard monochrome LCD displays are particularly desirable since they have a limited field of view. CRTs and more sophisticated LCD displays (supertwist and active matrix displays) permit better lateral viewing, however such extended viewing angles are inappropriate since it is desirable that only the user be able to observe the displayed data. In preferred form, display 100 is VGA compatible with a resolution of 640×480.

Located immediately adjacent the display screen, and between it and a user, is touch sensor matrix 102 which is shown in phantom. Touch sensor matrix 102 preferably is coupled to the interface module processor (not shown in this Fig.). Housing 92 also has LED 94 which indicates that module 90 has power and is in communication with control panel 30. Variable LED 96, also associated with housing half 92*a*, indicates the status of the system—green indicating normal operations, and red indicating a partial or complete system failure. By utilizing the built-in query functions of interface module 90, a user can rapidly determine where the failure has occurred since all such information is regularly broadcast to all modules through the intelligent interface loops.

A feature of module 90 permits a speaker to be located therein to present a user with audible tones or voice, and a microphone to permit the module to perform listen-in functions. The data necessary for audible tones can be generated by the interface module, or can be generated by the control panel and distributed to the interface modules. Transmission of sounds obtained via the microphone can be transmitted via the intelligent loop circuit, or can be part of a dedicated analog circuit separately connected to the control panel. While it is preferable to utilize the intelligent loop, bandwidth problems may be present.

Interface module 90 is constructed to carry out most access and data I/O functions of the system, thus permitting convenient monitoring of operations and structured modifications to the same. As described previously, panel 30 periodically broadcasts system status information along intelligent sensor loops 80*a* and 80*b* which is received by each module 90 and stored in memory. In addition, because each intelligent sensor loop is bi-directional in nature, access to panel 30 can be accomplished. In particular, any interface module 90 connected to panel 30 via dedicated or preferably intelligent sensor loops as is shown in FIG. 1 will permit user identification, verification, and structured access to command functions (depending upon the level of access permitted based upon verified user identity); status monitoring of the entire sensor system, including individual sensors, telco line integrity, UPS status, etc.; entry of new user pass codes and modification of existing pass codes (again, depending upon the level of access permitted); system control including enable, disable, clear, and scheduling; enablement and disablement of the panel alarm switch to permit access to the panel for hard and soft modifications thereto; placement of new sensors; software load of display information; and limited modification to system time such as for day light savings adjustments if not already programmed into the panel subsystem.

Figure 4:
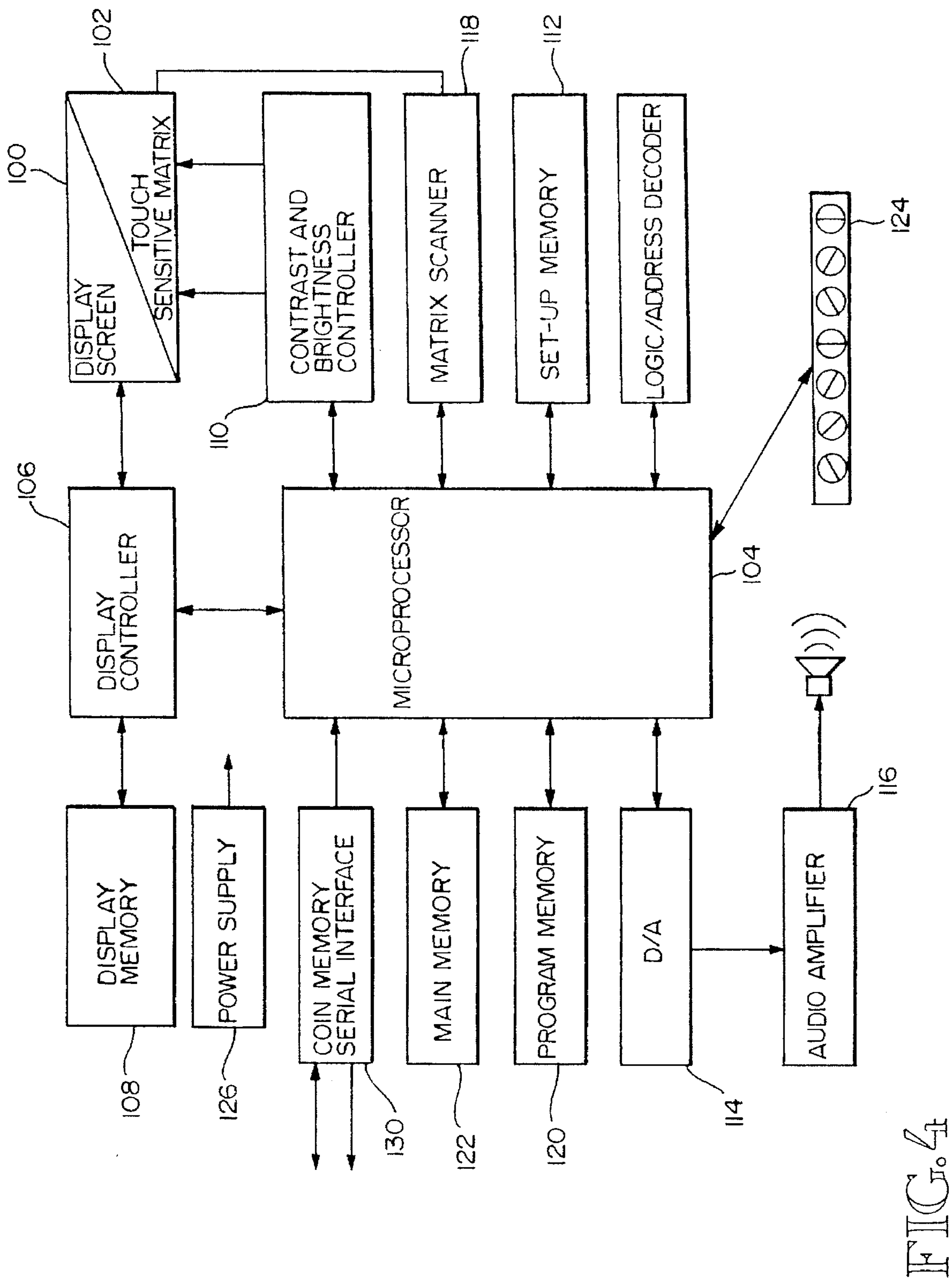
FIG. 4 is a block diagram of the interface module showing the various discrete components associated therewith.

A block diagram illustrating the electronic components for carrying out these functions is shown in FIG. 4. The electronic componentry of interface module 90 includes microprocessor 104 (Intel 80188EC), VGA controller 106 (Chips and Technology 65510) with associated display memory 108 (256 k×16 DRAM), LCD controller 110, EEPROM setup memory 112 (128 bytes), D/A converter 114, A/D converter 118, EPROM memory 120 (264 k) for storing module BIOS and command functions, EEPROM memory 122 (2 Mb) for storing display data (floor plans and icons), loop interface 124, power supply 126, and battery 128. Memory 122 is preferably flash memory but with the ability to selectively erase one or more of its 64 memory sectors. In this manner, it will be possible to store additional command functions therein and yet have the ability to update display data without having to restore the command functions that might be stored therein.

Installation and Configuration of a System—Off-Site:

The following discussion concerns the installation of a base system wherein a pre-existing intelligent sensor network has already been physically installed in general accordance with FIG. 1. An installer is located off-site and has a personal computer loaded with installation software which permits configuration of the sensor parameters, valid user names and access IDs, and permitted actions based upon defined access levels. Preferably, the installer is given plan drawings or blue prints of the current premises where the physical system is installed. The drawings are scanned and converted into a vector form, or such drawings are created in a software application such as Auto-Cad®, which is in turn converted into vector form and loaded into a database residing in the installer's personal computer.

At this time, the installer may also define the various actions to be carried out depending upon the state of the monitored sensor loops such as determining what telephone numbers will be dialed when there is a panic alarm, when there is a tripped fire sensor, etc. The installer may also determine what subroutines can be activated for any given access level. Icons, for use by any interface module 90, are selected from bit map image files and are also loaded into the database. Each icon preferably has one of four brightness levels assignable to it, thereby permitting brightness cycling to provide further information to the user. Because these operations are preferably done off-site, the result is decreased down time associated with on-site installation procedures.

Installation and Configuration of a System—On-Site:

When the installer arrives on-site, he or she then connects the computer to control panel 30 via interface port 54 and downloads the previously defined information into memory 36 of control panel 30. A list of authorized personnel is confirmed along with each person's access level to limit the operations for each that may be performed via an interface module 90. The system time and date is also established at this time and may not be subsequently changed except by one again creating a physical link between the installer's computer and panel 30. The remaining configuration is then carried out at any interface module 90.

The installer next connects the personal computer to any interface module 90 via port 114. Port 114 is serially connected to microprocessor 104 of interface module 90 in a manner similar as to that in control panel 30. It is at this time that the floor plan vector data and icon data is loaded into memory 122. While much of the control logic of module 90 is stored in memory 120 as firmware, custom commands can also be loaded into one or more sectors of memory 122.

After the installer disconnects from the interface module, pass codes are established for the installer and a representative of the business wherein the system is located, and verified. This information is transmitted to the control panel for incorporation into the database. Additional users can be defined at this point, but need not be. At this time, non-intelligent sensors can be confirmed.

Figure 5:
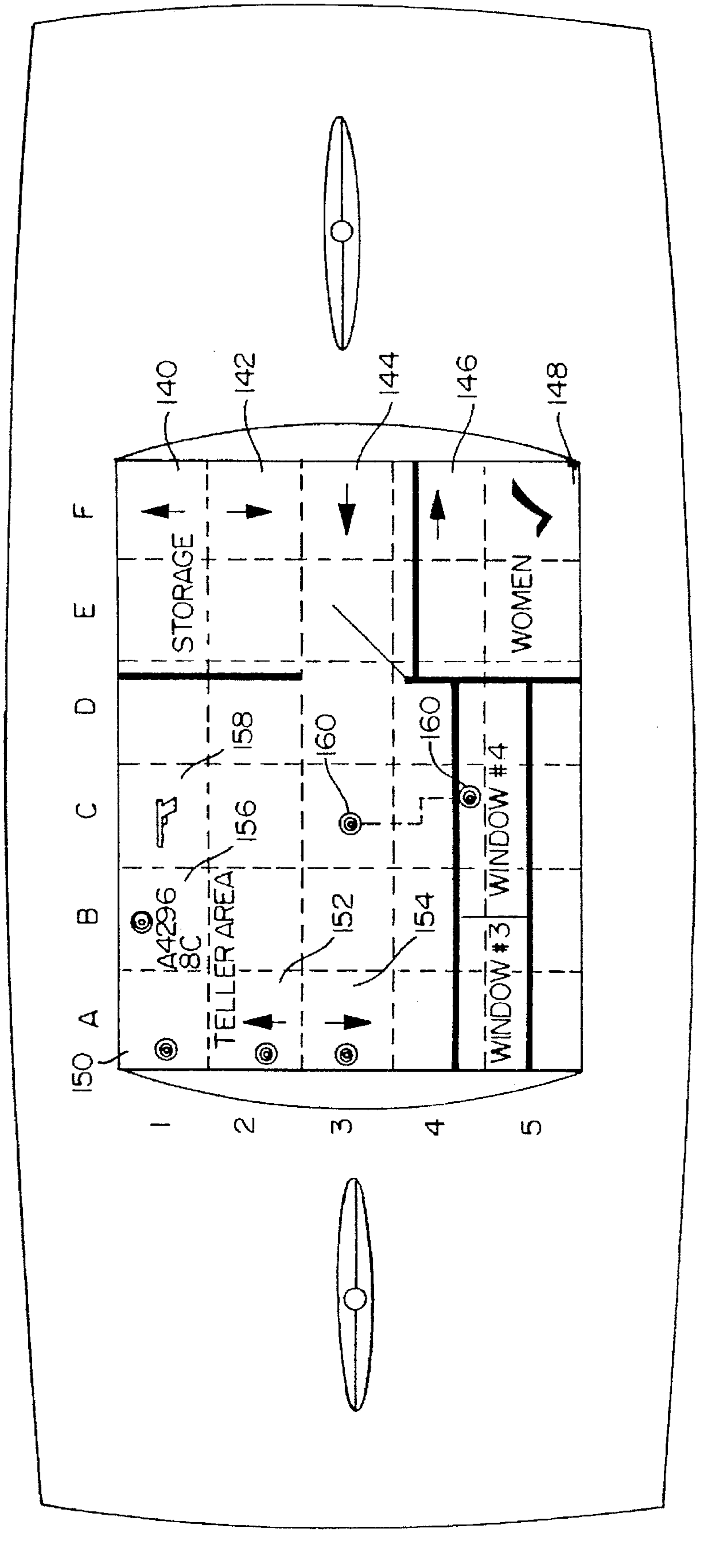
FIG. 5 is a full detail floor plan displayed by an interface module when locating a sensor position during initial installation or subsequent modification.

The last installation step concerns the identification and location of the various intelligent peripherals associated with the intelligent sensor loops, e.g., sensors and interface modules, generically referred to as a sensor. Upon issuance of a polling command by panel 30 which is common to network protocols, an ID listing of all such peripherals can be obtained and stored in memory 36. At this point, it is helpful to know the ID for each sensor or interface module since it will be necessary to "locate" each, via the ID, on a display map generated by an interface module 90. Assuming that the IDs are known, the installer or user, if permitted, activates a "Sensor Location" subroutine available at each interface module 90 (see, for example, cell D-4 in FIG. 7). An icon for the sensor initially appears on display 100. By touching a cell located in the area of the floor plan which corresponds to its physical location, a high detail display is generated as shown in FIG. 5. The sensor ID is displayed (shown in cell B-1) along with a type icon (shown in cell D-1). While the sensor ID cannot be changed, the installer or user may define the type by cycling through options through pressing type icon 158 shown in cell D-1.

Using arrow keys 140, 142, 144, and 146, the installer or user positions the identified sensor to the general location and presses the "✓" in cell F-5. In the example presented, touching the positioning keys causes a flashing sensor icon to move responsively to the user input to its final location in cell C-4 adjacent the "Window 4" position. After confirming the location of the sensor and its type, an abbreviated system sensor ID is assigned to it, such as N-8, which is transmitted to memory 34 of panel 30. For all future actions, panel 30 will translate the true sensor ID into the system sensor ID to increase the transmission rates along the intelligent sensor loops. In addition to transmitting the system sensor ID to main panel 30, interface module 90 locally stores the system sensor ID with the display vector coordinates and transmits the same information to any modules located on an intelligent sensor loop so that when commanded to display that sensor, its location is locally retrievable by any interface module. By repeating these steps for each sensor, such as pressing sensor scroll icons 152 and 154 at cells A-2 and A-3 respectively, the locations of each sensor can be established or modified.

Figure 6:
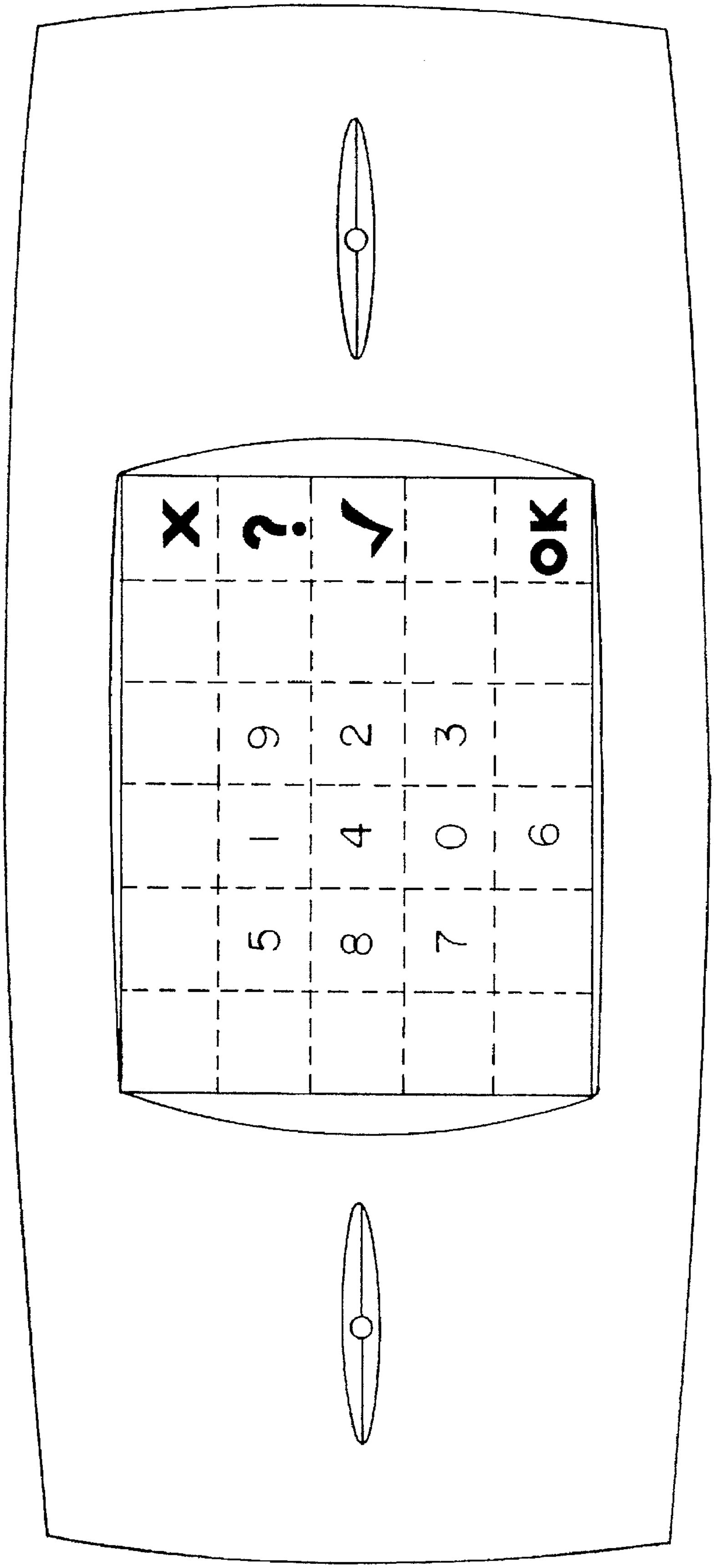
FIG. 6 is similar to FIG. 3 but wherein the display screen shows a keypad for entry of a user access code.
Figure 7:
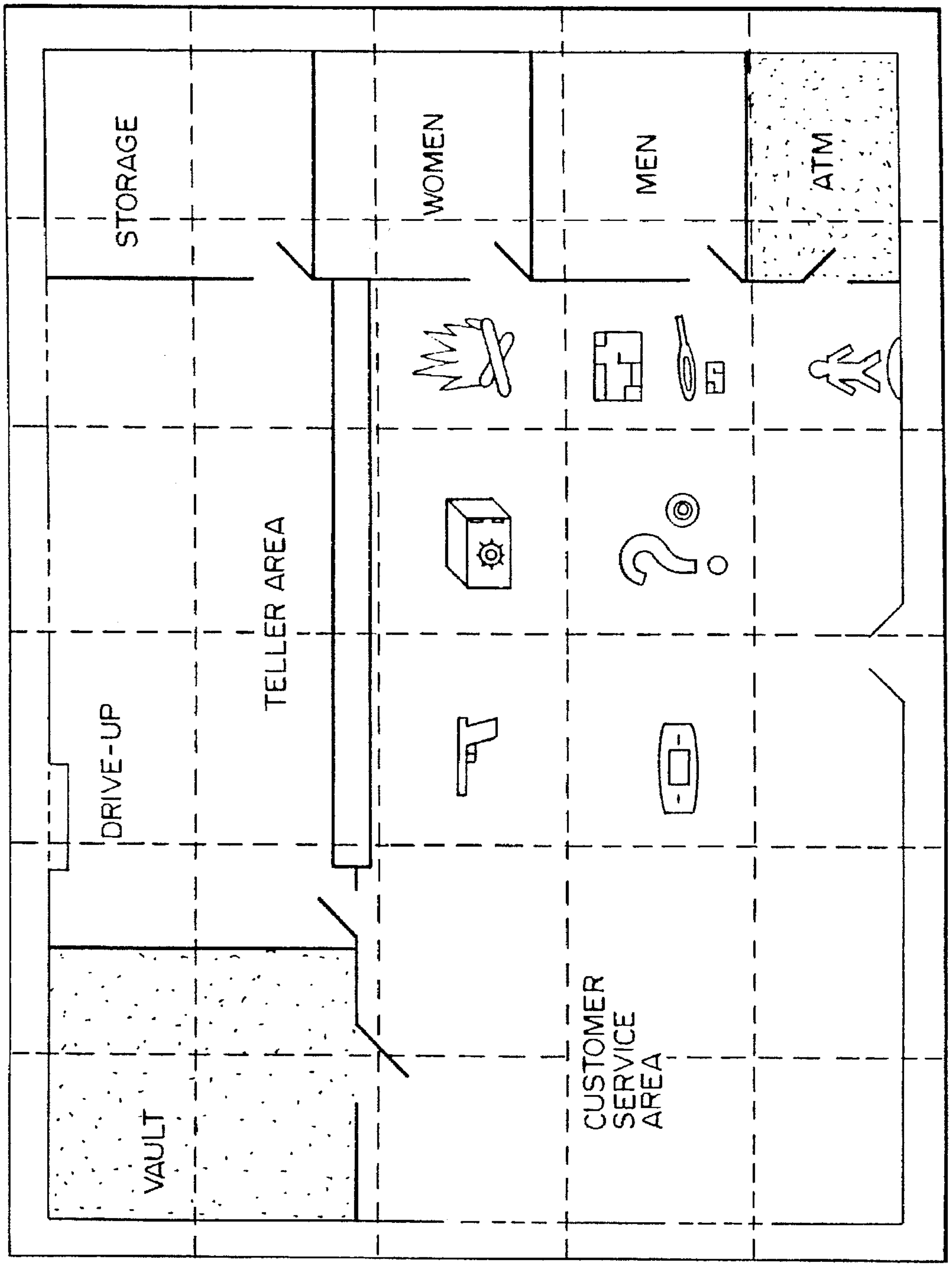
FIG. 7 shows an initial display of an interface module, after entry of a valid access code, allowing a user to perform predefined functions.
Figure 8:
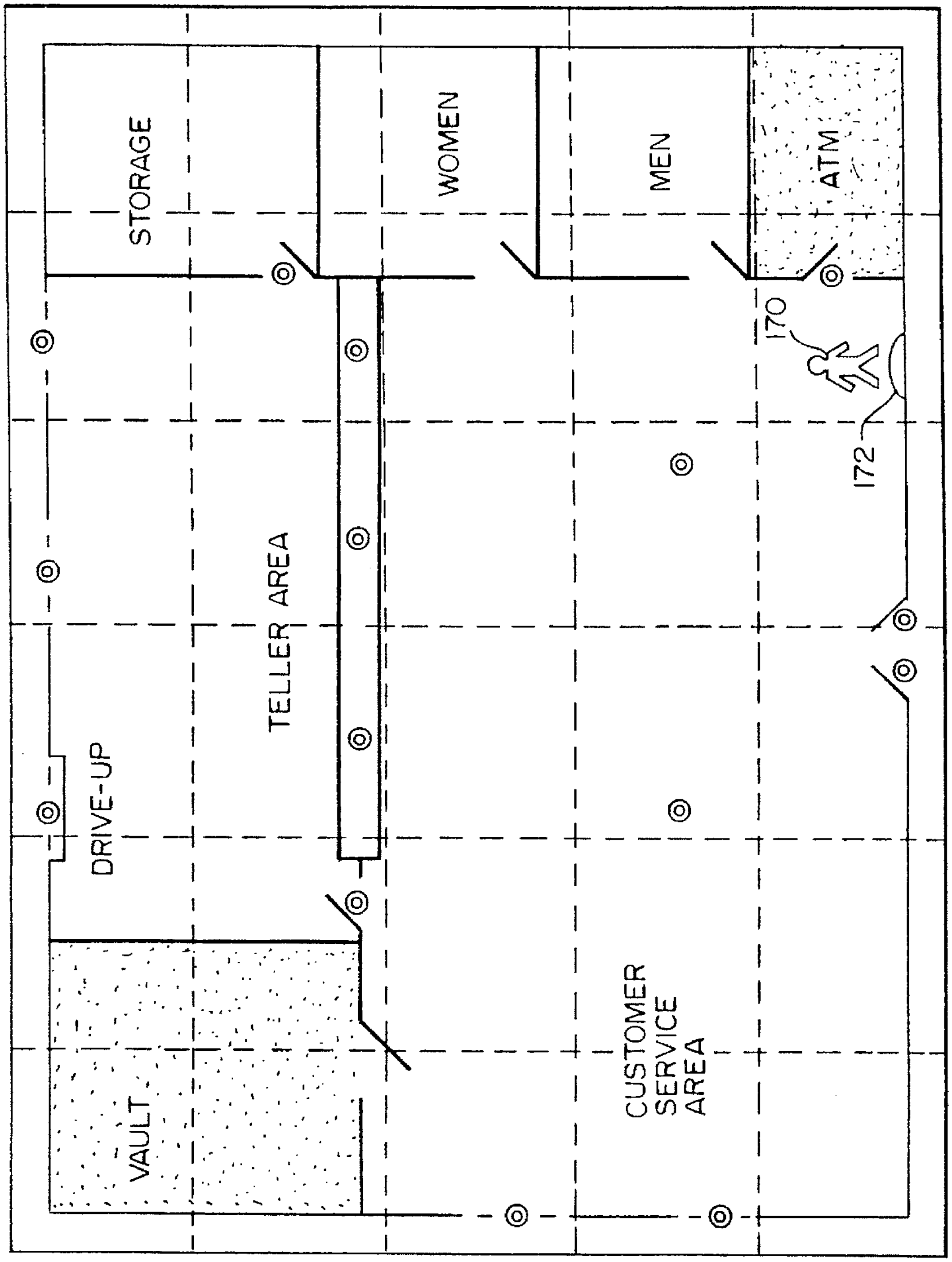
FIG. 8 is similar to FIG. 7, but shows the location of sensors associated with a perimeter sensor loop for the displayed floor plan.

Use of a System:

FIGS. 6, 7, and 8 show a progression of steps that a user might encounter when initially using interface module 90. First, the user prepares interface module 90 by touching any part of touch screen matrix 102. Upon receiving a valid access combination in response to a randomly generated soft keypad on the display screen of FIG. 6, a security access level is obtained from control panel 30. As those persons skilled in the art will appreciate, a user's identity or access clearance can be determined by ways other than a manually entered code combination and can include visual or voice identification (finger print, retinal, or voice verification), magnetic card identification (stripe, card, or pattern), physical keys, or chip identification. The choice of manual code entry is considered preferable because of the low production cost and high level of security involved.

After receiving the access level from control panel 30, interface module 90 initiates an appropriate subroutine to enable the user to carry out permitted system access functions. As illustrated in FIG. 7, this user may be able to verify the status of each sensor type (perimeter verification by touching cell C-3 and cell D-4, vault verification by touching cell D-3 and cell D-4, or fire verification by touching cell E-3 or D-4), or select control functions by touching cell C-4 instead of D-4 after touching the appropriate sensor type icon.

Figure 9:
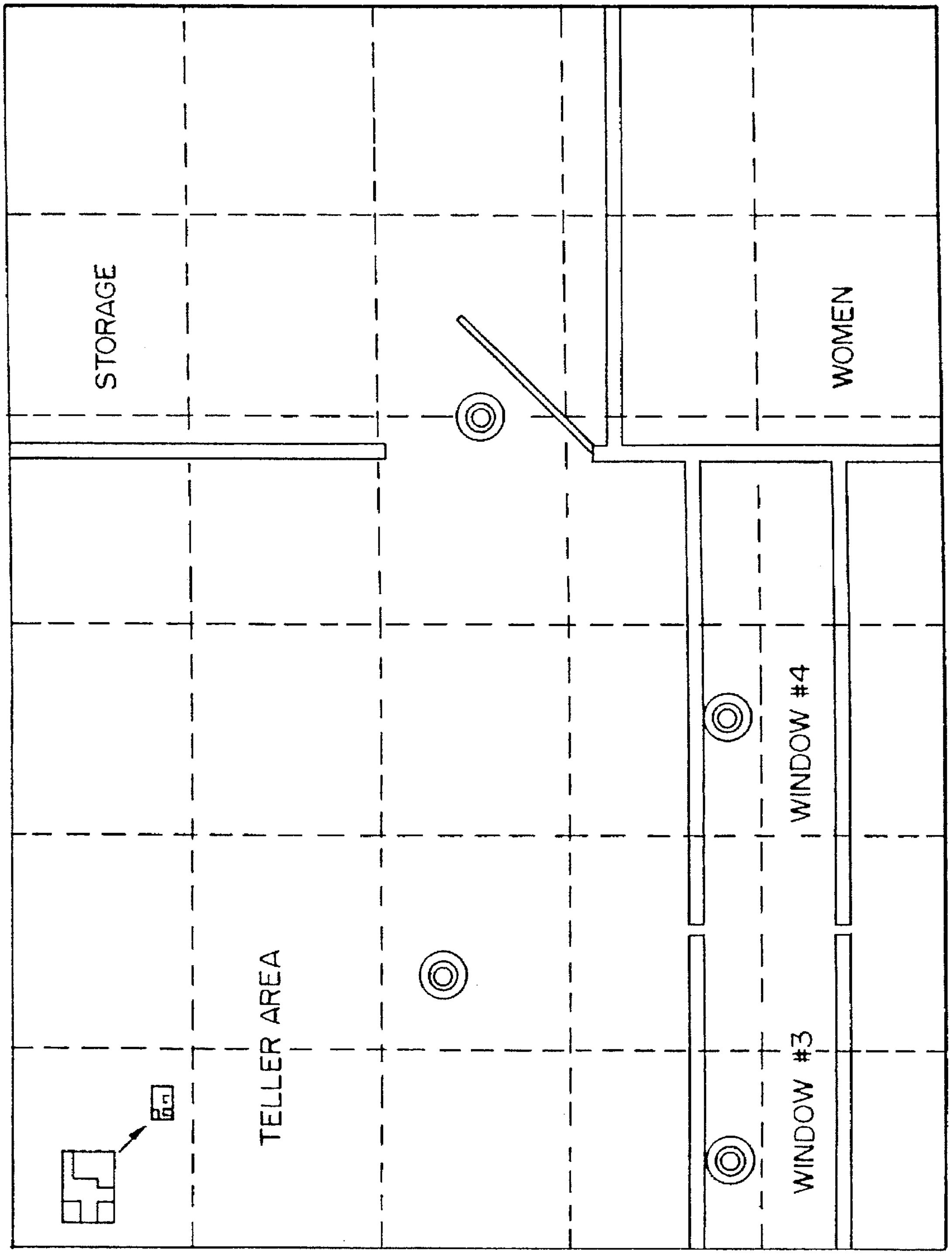
FIG. 9 is a high detail floor plan of FIG. 8 showing in detail the location and status of perimeter sensors present in the displayed area.

In FIG. 8, the floor plan of a single floor of an office building is shown with the location of perimeter sensors shown in conjunction therewith. Such a display would be presented after a user touched the perimeter sensor icon in cell C-3 and sensor information icon in cell D-4 in FIG. 7. This scale of display is preferable to orient the user to his or her location relative to the floor. To assist in orientation, human icon 170 is shown adjacent to activated interface module icon 172 in cell E-5. However, this display may lack sufficient detail to permit the user to have sufficient information concerning a particular area and/or sensor. Consequently, the present invention provides the user with the option of enlarging the desired portion of the floor plan by touching the screen in the desired area, such as cell E-2. Upon such an action, a high detail view of the plan is presented to the user as is shown in FIG. 9.

While the use of a vector based database to provide layout and sensor location is advantageous, such information must first efficiently be entered into the control unit's memory for subsequent on-demand distribution to the remote interface modules. To carry this out, it is possible to directly upload floor plans already existing in electronic form such as generated by AUTO-CAD® or other publicly available design software, or a hard copy floor plan may be digitized and imported into such a program and then uploaded into the control panel's memory. The existing sensor locations and designations aye then keyed to the uploaded detail so that for each sensor location, a particular sector is assigned thereto which in turn is coupled to a maximum detail floor plan. Because the floor plan and sensor location are stored in memory as vector information, a user can enlarge any sector of the floor plan to obtain greater detail in regards thereto as previously described.

What is claimed:

1. An intelligent interface module locatable on a premises for use in combination with a control panel and a sensor, said module comprising:

a housing;

a processor located internal to the housing and operatively coupled to memory means, to the control panel, and to the sensor wherein the memory means has the capacity to retain user definable data information associated with the physical description of at least a portion of the premises and user definable data information associated with the physical location of the sensor;

an exposed visual display operatively coupled to the processor and adapted to display at least one graphic representation of the user definable data information associated with the physical description of at least a portion of the premises and the user definable data information associated with the physical location of the sensor; and an input means operatively coupled to the processor for permitting user selective access to the processor.

2. The module of claim 1 wherein the sensor is integral with the housing.

3. The module of claim 1 wherein a sensor ID is incorporated with a signal detectible by the module.

4. The module of claim 2 wherein a sensor ID is incorporated with a signal detectible by the module.

5. The module of claim 1 wherein a module ID is incorporated with a signal detectible by the control panel.

6. The module of claim 1 wherein the input means is physically separate from the display.

7. The module of claim 6 wherein the input means comprises at least one physically responsive switch.

8. The module of claim 1 wherein the input means is operable in conjunction with the display.

9. The module of claim 8 wherein the input means is a touch sensitive matrix located on the display.

10. The module of claim 1 wherein the visual display is selected from the group consisting of a liquid crystal display, a cathode ray tube, and a plasma display.

11. The module of claim 1 further comprising an emergency switch.

12. The module of claim 1 wherein system status is maintained the memory means, thereby reducing data exchange between the module and the control panel.

13. The module of claim 1 further comprising an audible frequency transmitter.

14. A multiplexed, distributed intelligence monitoring and alarm system locatable in a premises comprising:

a control panel having a) memory means sufficient for selectively retaining data associated with control panel operating system instructions and user definable functions, b) input means for receiving data information from and output means for sending data information to at least one remote interface module, and c) processing means for responding to data input received from the at least one remote interface module and generating output to the at least one interface module based upon control panel operating system instructions, all elements being operatively coupled to one another;

a remote interface module locatable distant from the control panel and operatively coupled to the input and output means of the control panel and having a) memory means sufficient for storing user definable data information associated with the physical description of at least a portion of the premises and interface module operating system functions, b) input and output means for receiving and sending data information from and to the control panel;

c) a processor operatively coupled to the memory means, the input means, and the output means for responding to input and generating output based upon interface module operating system instructions, and, d) an exposed visual display operatively coupled to the processor and adapted to display at least one graphic representation of the user definable data information associated with the physical description of at least a portion of the premises and user definable data information associated with the physical location of at least one sensor; and at least one sensor operatively coupled to the input and output means of the control panel whereby the data associated with the physical description of at least a portion of the premises and the at least one sensor can be presented for user perception.

15. The system of claim 14 wherein the at least one sensor is linked to the remote interface module, thereby establishing operative coupling with the control panel.

16. The system of claim 14 wherein the control panel is constructed to accept sensor signal input generated by a sensor selected from the group consisting of perimeter, control, and fire sensors.

17. The system of claim 14 wherein the system is supplied with power from a public service and further comprising a battery for maintaining system functions in the event of a public power outage, and control circuitry operable by the control panel processing means for selectively maintaining power to user definable portions of the system.

18. The system of claim 14 further comprising a telco interface and dialer for selectively establishing contact with an external location to transmit data thereto and receive data therefrom.

19. The system of claim 14 further comprising an RF receiver operatively coupled to the processor wherein activation of the dialer may be initiated by transmitting an RF signal to the RF receiver whereupon an appropriate signal generated by the receiver causes the processor to activate the dialer.

* * * * *